(12) United States Patent
Harvey et al.

(10) Patent No.: US 7,784,511 B2
(45) Date of Patent: Aug. 31, 2010

(54) PNEUMATIC TIRE HAVING EXTENSION BLOCKS

(75) Inventors: Delwyn Lovell Harvey, North Canton, OH (US); John Fleming Brainerd, II, Medina, OH (US); Brian David Digman, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 734 days.

(21) Appl. No.: 11/803,358

(22) Filed: May 14, 2007

(65) Prior Publication Data

US 2008/0210355 A1    Sep. 4, 2008

Related U.S. Application Data

(60) Provisional application No. 60/904,494, filed on Mar. 2, 2007.

(51) Int. Cl.
*B60C 11/01* (2006.01)
(52) U.S. Cl. .............................. 152/209.8; 152/209.16; 152/523

(58) Field of Classification Search ............ 152/209.16, 152/523, 209.8; D12/605
See application file for complete search history.

(56) References Cited

U.S. PATENT DOCUMENTS

| D92,281 S | * | 5/1934 | Anderson | 152/209.16 |
|---|---|---|---|---|
| 4,055,209 A | * | 10/1977 | Senger | 152/209.16 |
| 5,361,814 A | * | 11/1994 | Covert et al. | 152/209.16 |
| D563,311 S | * | 3/2008 | Brainerd et al. | D12/605 |
| D563,312 S | * | 3/2008 | Brainerd et al. | D12/605 |
| 2003/0041939 A1 | * | 3/2003 | Allison et al. | 152/209.1 |
| 2005/0103416 A1 | * | 5/2005 | Rooney et al. | 152/209.16 |

* cited by examiner

*Primary Examiner*—Steven D Maki
(74) *Attorney, Agent, or Firm*—Robert N. Lipcsik

(57) ABSTRACT

A tire has a tread and a pair of opposing shoulders. In the first sidewall, a series of extension blocks creates a pair of concentric rings. In the second sidewall, a different configuration of extension blocks may be present. The second sidewall has alternating extension blocks where one of the blocks has a portion that is located radially inward of the other block.

1 Claim, 5 Drawing Sheets

PNEUMATIC TIRE HAVING EXTENSION BLOCKS

This application claims the benefit of, and incorporates by reference, U.S. Provisional Application No. 60/904,494 filed Mar. 2, 2007.

FIELD OF THE INVENTION

The present invention relates to a pneumatic tire. More particularly, the present invention is directed to a pneumatic tire having defined features in the tires sidewalls and tire tread.

BACKGROUND OF THE INVENTION

In a conventional pneumatic tire, particularly a high-performance tire, the tread pattern is generally formed by combining circumferential grooves extending along the circumferential direction of the tire with a plurality of grooves inclined relative to the circumferential direction. The combination of grooves forms a plurality of tread blocks along the radially outer surface of tire. If the inclined grooves do not extend completely across the equatorial plane of the tire, a central rib may be formed in the tread.

A very popular class of motor vehicles are those which the owner can use both for commuting over paved highways and for recreational use in off-highway situations. Such vehicles often take the form of pick-up trucks or small general purpose motor vehicles. It is quite common for such on/off road vehicles to have four wheel drive capability. Such vehicles present a special challenge to a tire engineer because the performance characteristics desired for highway use are tradeoffs with the performance requirements for off-road use. For example, mud traction versus treadwear, off-road handling versus on-road handling, and wet traction versus dry traction. Furthermore, when an on/off road all purpose vehicle is used for commuting about town it is seldom loaded to its full weight capacity, whereas when the same vehicle is packed with recreational equipment for off-road use the tires are subjected to much greater loads. A tire according to the present invention has the capacity to provide adequate tread-wear, mud traction, sand traction, on road handling, off road handling, wet traction and dry traction when used with small general purpose motor vehicles and trucks.

SUMMARY OF THE INVENTION

The present invention is directed to a pneumatic tire wherein the sidewalls may be individualized to obtain different traction characteristics in each sidewall.

In one aspect of the invention, disclosed is a pneumatic tire. The tire has a tread located between opposing tread edges and a pair of opposing sidewalls. The tread has a plurality of tread elements separated by at least one groove. Located in at least one of the opposing sidewalls are extension blocks. The extension blocks are arranged so as to create a pair of concentric rings of extension blocks, and no blocks in each of the concentric rings are radially aligned with blocks in the other of the concentric rings.

In another aspect of the disclosed tire, the extension blocks located in the sidewall have a height of 1.5 to 10.0 mm above the main surface of the sidewall.

In another aspect of the disclosed tire, the extension blocks located in the sidewall are frustrum shaped with a polygonal base and inclined sides.

In another aspect of the disclosed tire, the inclined sides of the extension blocks are inclined at angles of 40° to 80° relative to the polygonal base.

In another aspect of the disclosed tire, the number of extension blocks in the radially outer concentric ring of blocks is twice the number of extension blocks in the radially inner concentric ring of blocks.

In another aspect of the disclosed tire, the number of extension blocks in the radially outer concentric ring of blocks is equal to the number of extension blocks in the radially inner concentric ring of blocks.

In another aspect of the disclosed tire, the second opposing sidewall has the same extension block configuration. However, the second opposing sidewall may a different extension block configuration.

Also disclosed is a tire having a different, or second, sidewall configuration. The tire has a tread located between a pair of opposing tread edges and a pair of opposing sidewalls. The tread has a plurality of tread elements arranged in a tread edge region of the tread with adjacent tread elements being separated by a groove. In the sidewall adjacent to the tread edge region is a plurality of blocks located along the circumference of the sidewall. Each block is associated with a tread element in the tread edge region. The blocks are arranged in an alternating pattern of first and second blocks. A portion of the first blocks is a circumferential extension located radially inward of the second blocks.

In another aspect of this disclosed tire, the second blocks have a predominate length in the circumferential direction of the tire, the predominate length inclined at an angle of 0° to 40° relative to the circumferential direction of the tire.

In another aspect of this disclosed tire, the circumferential extension of the first blocks has a maximum circumferential length of a full pitch length, the pitch length being the circumferential length between adjacent first blocks.

In another aspect of this disclosed tire, the first blocks have a radial length greater than the radial length of the second blocks.

In another aspect of this disclosed tire, the first blocks extend directly from tread elements in the tread edge region.

In another aspect of this disclosed tire, the second blocks are spaced from the tread elements in the tread edge region.

In another aspect of this disclosed tire, the second opposing sidewall has the same block configuration. However, the second opposing sidewall has a different block configuration.

Also disclosed is a tire having different sidewall configurations for each sidewall of the tire. Disclosed is a pneumatic tire having a tread located between a pair of opposing tread edges and a pair of opposing sidewalls. The tread has a plurality of tread elements arranged in a tread edge region of the tread with adjacent tread elements being separated by a groove. In the first sidewall is a plurality of extension blocks. The extension blocks are arranged so as to create a pair of concentric rings of extension blocks. No blocks in each of the concentric rings are radially aligned with blocks in the other of the concentric rings. The second sidewall is adjacent to the tread edge region. There is a plurality of blocks located along the circumference of the second sidewall. Each of these blocks is associated with a tread element in the tread edge region with the blocks being arranged in an alternating pattern of first and second blocks. A portion of the first blocks is a circumferential extension located radially inward of the second blocks.

DEFINITIONS

The following definitions are controlling for the disclosed invention.

"Axial" and "axially" are used herein to refer to lines or directions that are parallel to the axis of rotation of the tire.

"Centerplane" means the plane perpendicular to the tire's axis of rotation and passing through the center of its tread.

"Circumferential" means lines or directions extending along the perimeter of the surface of the annular tire parallel to the Centerplane and perpendicular to the axial direction.

"Radial" and "radially" are used to mean directions radially toward or away from the axis of rotation of the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
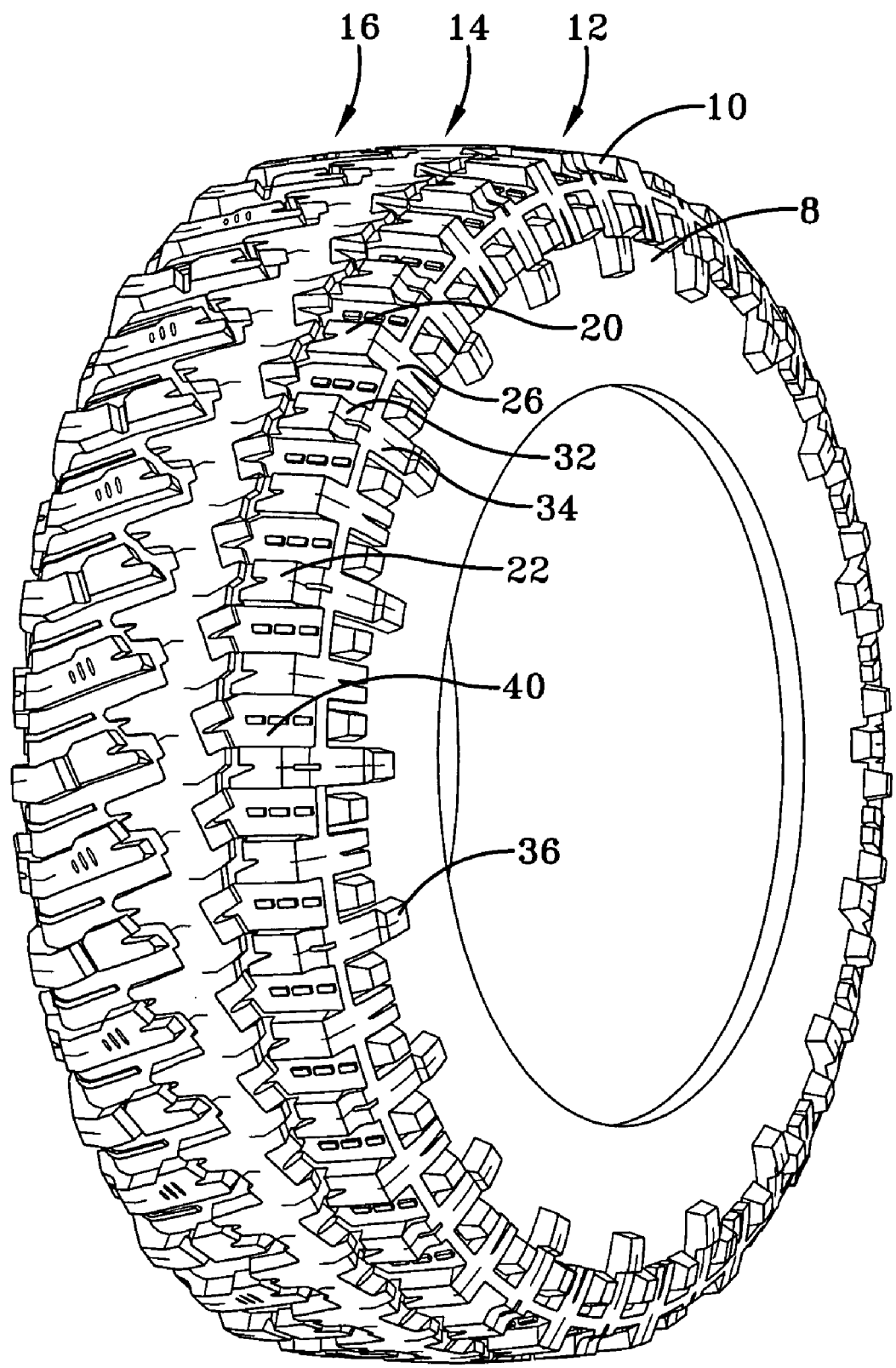
FIG. 1 is one perspective view of a tire.
Figure 5:
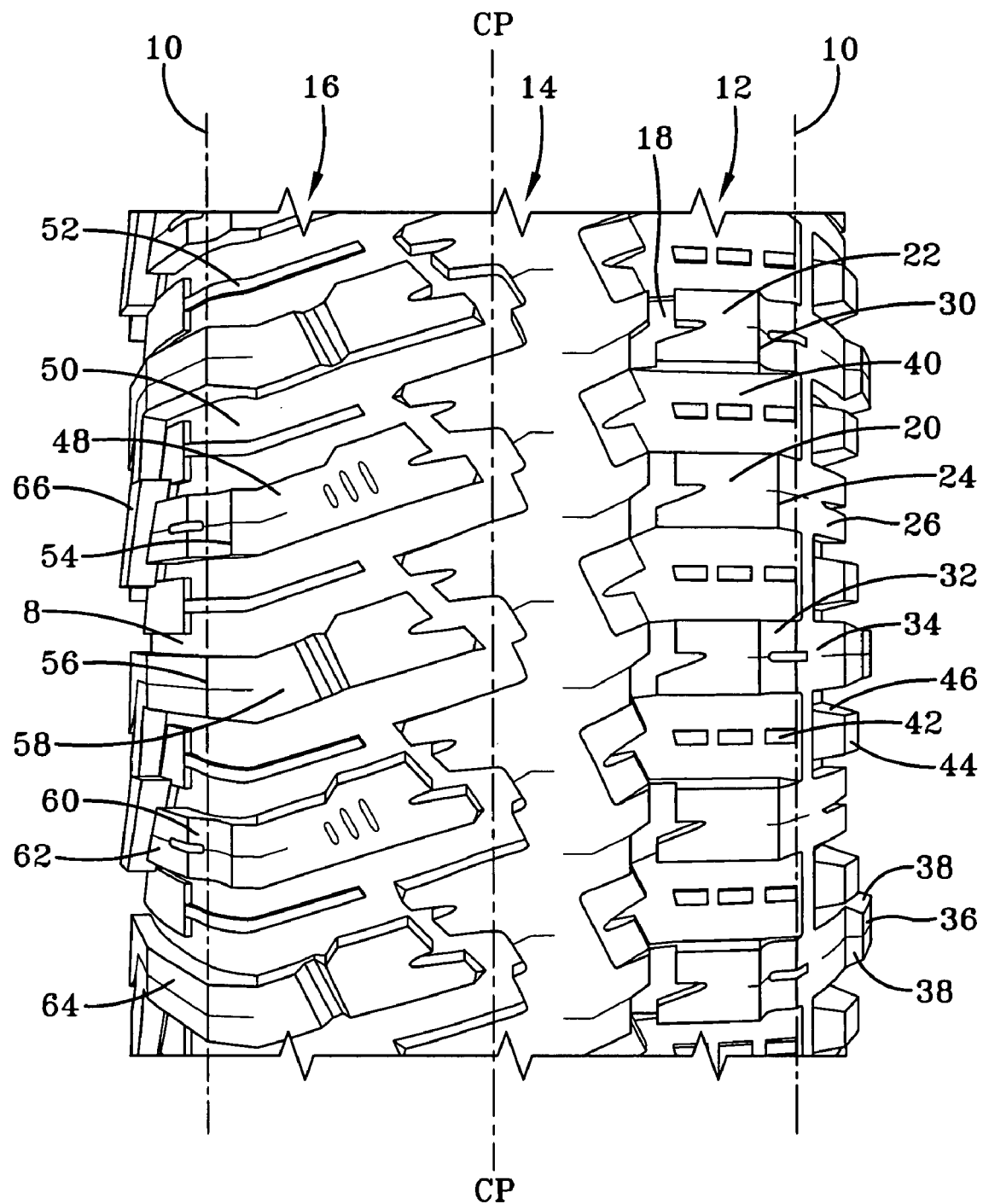
FIG. 5 is a flat view of the tire tread.

FIG. 1 illustrates a pneumatic tire having a tread and sidewalls 8. A flat view of the tread is illustrated in FIG. 5. The tire has an asymmetric tread located between a pair of opposing tread edges 10. The sidewalls 8 are axially outward and radially inward of the tread edges 10. The tread has a plurality of traction elements in three defined tread regions: a first edge region 12, a central region 14, and a second edge region 16. In each tread region 12, 14, 16, the traction elements are distinct from the traction elements in the other tread regions.

The first edge region 12 extends axially inward from a first tread edge 10. Initiating at short length circumferential grooves 18 are circumferentially adjacent blocks 20, 22. The overall block configuration of each block 20, 22 is similar, with the axial extent of circumferentially adjacent blocks 20, 22 alternating in a wide-narrow pattern, with the axially inner edges of the blocks aligned. The axially outer edge 24 of each wider width block 20 connects to a radially extending surface 26 that is flush, or mergers, with the tire sidewall 8. The smaller width blocks 22 have an axially outer edge 30 that is axially inward of the tread edge, and flows into a portion 32 having a radially inward curved surface; portion 32 being connected to a radially extending surface 34 flush with the sidewall 8.

Figure 2:
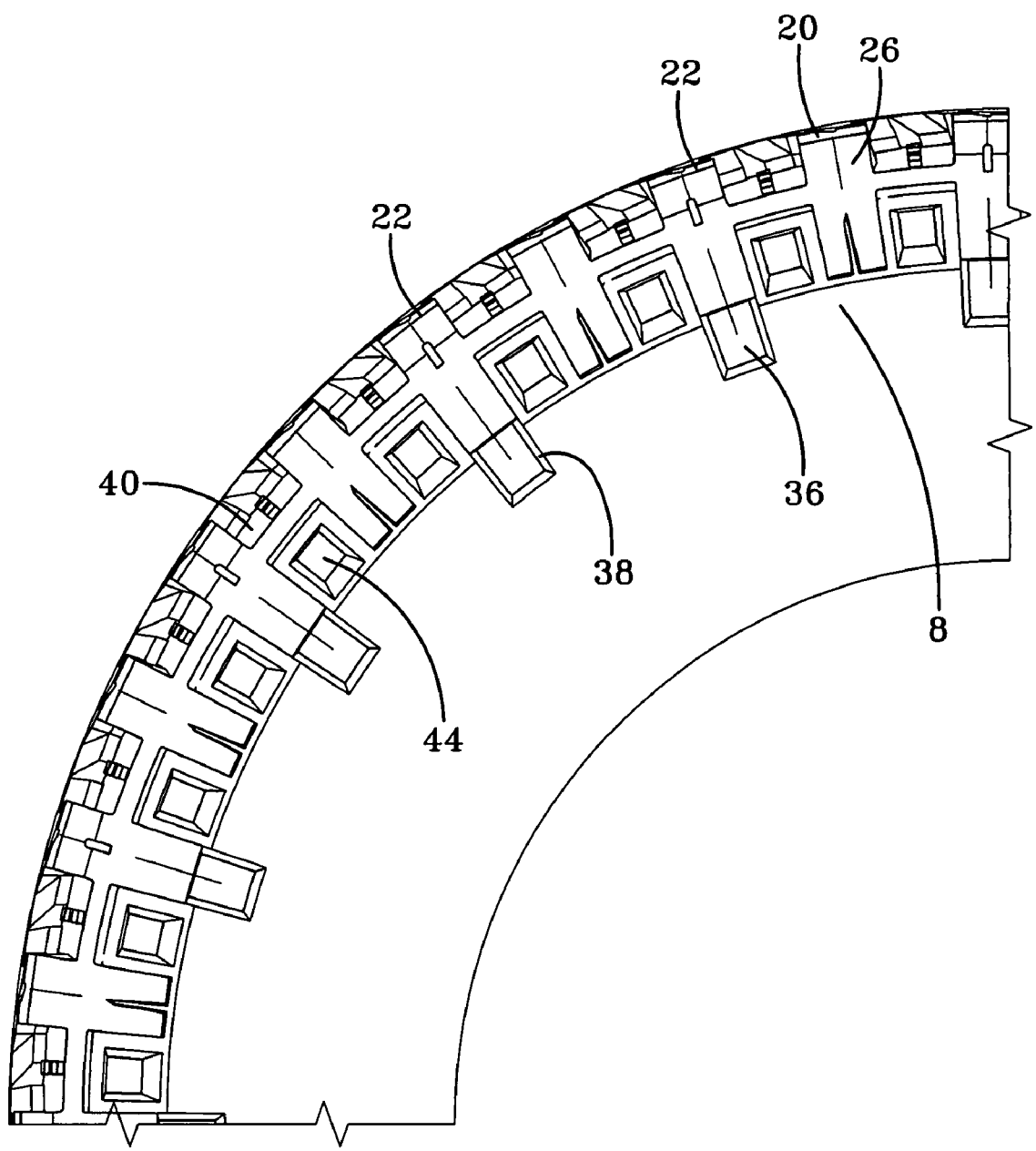
FIG. 2 is a side view of one side of the tire.
Figure 3:
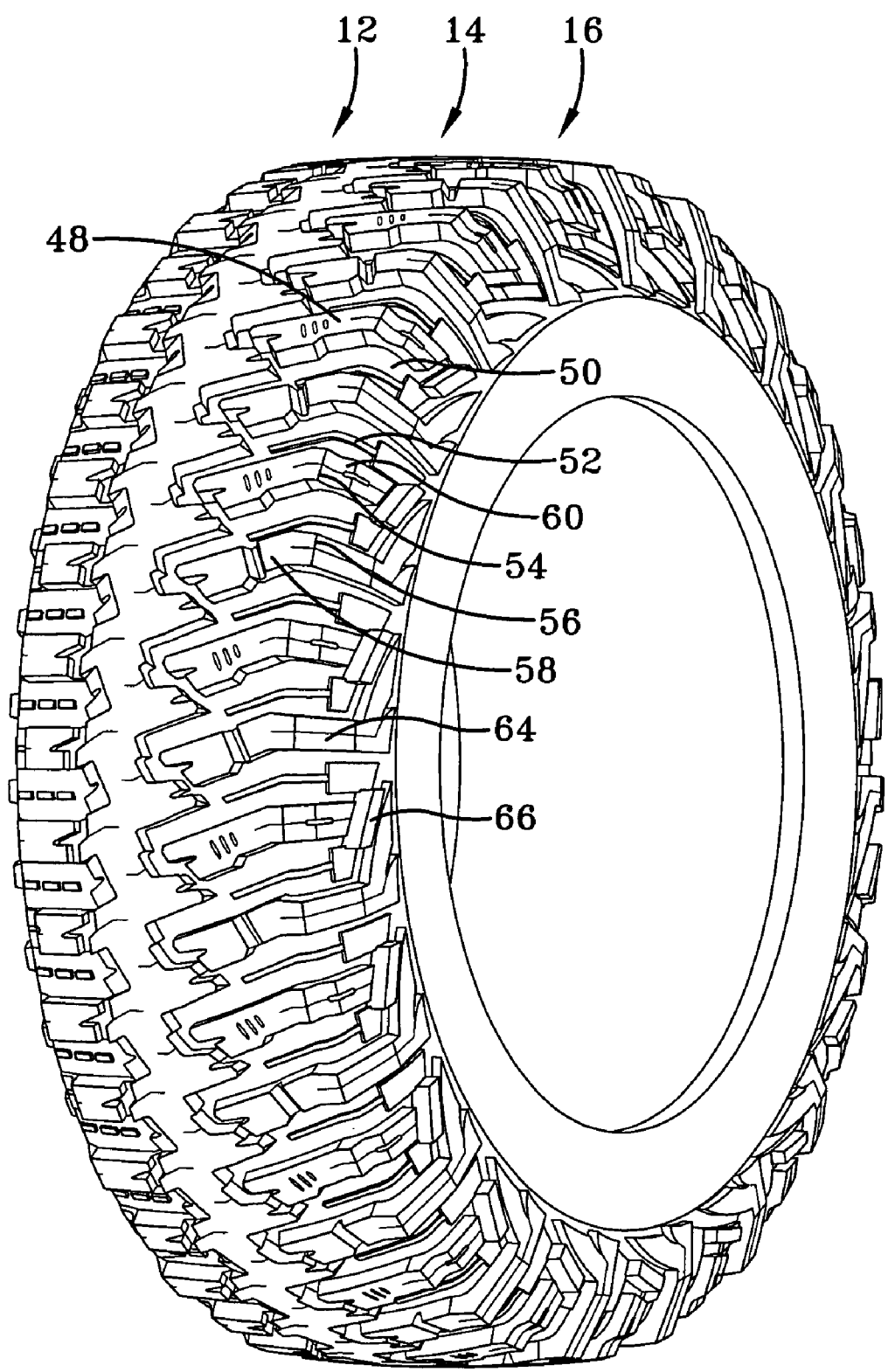
FIG. 3 is another perspective view of the tire.

Aligned with the axially outer edge 30 of each smaller width block 22, and located axially outward of the tread edge 10 and in the tire sidewall 8, is a sidewall extension block 36, see also FIG. 2. The extension block 36 has a height in the range of 10 to 80% of the height of the tread traction elements 20, 22. For the range of light truck, passenger tire sizes for which the present tread is likely to be most useful, the extension blocks 36 have a height of 1.5 to 10 mm above the main surface of the sidewall. The illustrated block 36 is frustum shaped, with a square base and sides 38 inclined at angles of 40° to 80° relative to the frustum base. While the block 36 has a square base, the base may have any other geometrical base configuration and the appropriate number of associated sides 38. For example, if the base has a triangular base, the block 36 will have three inclined sides while if the base is pentagonal, the block 36 will have five inclined sides. Additionally, the inclination angles of the block sides 38 may differ. For example, the radially outermost block side may be inclined at a lower angle, relative to the block base, compared to the radially innermost block side.

Between each tread block 20, 22 is a very wide lateral groove 40. The groove 40 is inclined at an angle in the range of 45° to 90°, or 75° to 90°, relative to the tire centerplane CP. Within each wide lateral groove 40 is at least one stone ejection element 42. Illustrated are three laterally aligned ejection elements 42. The ejection elements 42 are centrally located within the wide groove 40 to provide protection to the base of the groove 40.

Aligned with the wide lateral groove 40, and located axially outward and radially inward of the tread edge 10 and in the tire sidewall 8, is a second extension block 44. The block 44 is similar to the previously discussed sidewall extension block 36. The block 44 is a frustum, with a geometric shaped base and a number of sides 46 corresponding to the number of sides of the block base. The block 44 has a height of 10 to 80% of the tread traction elements, and is in the range of 1.5 to 10 mm above the surface of the tire in which the block 44 is positioned. The sides 46 of the block 44 are inclined at 40° to 80° relative to the block base, and the sides 46 may be inclined at different angles.

Because these blocks 44 are associated with each groove 40 in the illustrated tire, these blocks 44, along with the other blocks 36 create two concentric circles of extending traction blocks 36, 44 in the shoulders/upper sidewall regions 28 of the tire; the blocks 36 forming a circle of blocks with a greater diameter and the blocks 44 forming a circle of blocks of a lesser diameter. Due to the alignment of the extension blocks 36 with the blocks 22 and the extension blocks 44 with the grooves 40, none of the blocks 36, 44 in the either of the concentric rings are radially aligned with blocks 36, 44 in the other ring; i.e. the blocks 36, 44 in the concentric rings are circumferentially spaced from one another with no overlapping of the blocks 36, 44.

For the illustrated tire, the block 36 is only associated with shorter width block 22, there are twice the number of extension blocks 44 in the radially outer concentric ring of blocks 44 than in the inner ring of blocks 36. However, to create more traction elements in the sidewall 8, an extension block may be formed at the end of the inclined surface 26. This would yield an equal number of extension blocks 36, 44 in both concentric rings of blocks.

The second edge region 16 of the tread extends axially inward from the second tread edge 10. The second edge region 16 has wide tread blocks 48 extending from the tread edge 10 to the central region 14 of the tire tread. The blocks 48 are delineated by wide lateral grooves 50. The lateral grooves 50 are inclined at a low angle relative to the tire centerplane, and may be inclined at any angle in the range of 0° to 45° relative to the tire centerplane. Within the lateral groove 50 is at least one stone ejector 52. The stone ejector 52 is centrally located in the groove 50 and has a narrow width. The ejector 52 may be divided into multiple short length ejectors such as in the opposing tread edge region 12. Alternatively, the stone ejectors may be located in every lateral groove 50, every other lateral groove 50, or in a limited number of grooves 50, see FIG. 5.

Similar to the first tread edge 12, the axially outer edges 54, 56 of the circumferentially adjacent blocks 48, 58 in the second tread edge 16 have an alternating pattern relative to the tread edge line 10 wherein every other block 48 has an axially outer edge 54 that is spaced axially inward from the tread edge 10. The blocks 48 having such a spaced axially outer edge 54 are connected to a curved portion 60 which is connected to a radially extending surface 62. The axially outer edge 56 of the other blocks 58 connects to a radially extending block 64 which mergers with the tire sidewall 2.

Figure 4:
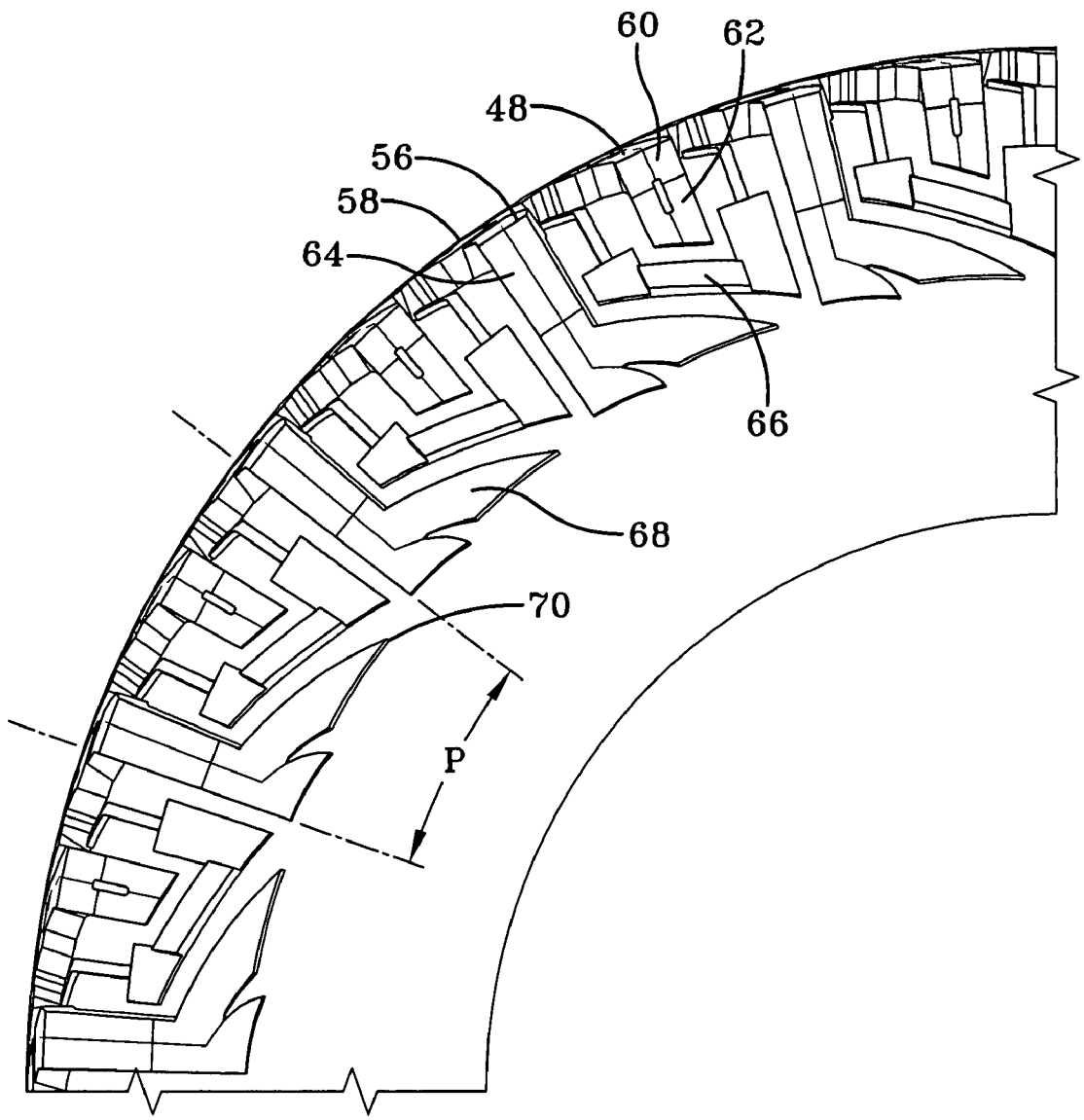
FIG. 4 is a view of the second side of the tire.

Along the second sidewall, see FIG. 4, the block extensions are different from the extensions of the first sidewall. Along the radially outer portion of the sidewall 8, aligned with and spaced radially inward of the tread blocks 48 that have a curved portion 60, is a series of elongated extension blocks 66. The extension blocks 66 have a predominate length in the circumferential direction of the tire and may be inclined relative to the circumferential direction of the tire in the range of 0° to 40°.

Between circumferentially adjacent elongated block extensions 66 and aligned with, and extending directly from, the alternating tread blocks 48 is the radially extending block 64. The radially extending block 64 has a radial length greater than the adjacent blocks 66. At the radially inner end of the block 64 is a circumferential extension 68 that passes under the elongated extension blocks 62. The circumferential extension 68 has a length such that the terminal point 70 of the circumferential extension is at least aligned with the far end of the elongated extension block along a radial line. The circumferential extension may have a circumferential length equivalent to the full pitch length P between repeating sidewall elements.

While the patterns along the two opposing sidewalls of the illustrated tire differ from one another, it is within the scope of this invention to form both sidewalls with the same pattern. The same pattern may be that of the first sidewall, as see in FIG. 2, or the pattern of the second sidewall, as seen in FIG. 4. Placement of each sidewall block arrangement is determined by the axially outer edge of the tread block in each respective tread edge region.

In the central region of the tread there is a continuous rib. One side of the rib is delineated by a non-straight continuous circumferential groove. The opposite side of the rib is delineated by alternating short length inclined circumferential grooves and lateral grooves extending from the second shoulder region. Along one side of the rib, adjacent to the wide lateral grooves in the first shoulder region, is a chamfer divided by a short length, blind groove. However, the central tread region of the tire may vary depending upon the desired tire characteristics. For example, the rib may be divided into circumferentially adjacent blocks by the inclusion of lateral grooves in the central tread region.

Per the present invention, the characteristics of the tire may be varied with the different and distinct sidewalls. If the tire is provided with the different sidewall features on the opposing sidewalls, the tire may be mounted in one direction depending upon the end use of the tire. For example, if the tire is to be used in more off-road type situations, the first sidewall of concentric extending blocks may provide greater traction properties than the opposing sidewall while the second sidewall may provide greater sidewall puncture protection. If the end use of the tire is consistent, the tire may be provided with matching sidewall features.

What is claimed is:

1. A pneumatic tire, the tire comprising a tread located between opposing tread edges and a pair of opposing sidewalls, the tread having a plurality of tread elements separated by at least one groove, the tread elements being arranged in a tread edge region of the tread, wherein, located in a first opposing sidewall are a plurality of extension blocks, the extension blocks being arranged so as to create a pair of concentric rings of extension blocks, and no blocks in each of the concentric rings are radially aligned with blocks in the other of the concentric rings, the extension blocks of each concentric ring of the first opposing sidewall being frustrum shaped with polygonal bases, inclined sides, and heights of 1.5 mm to 10.0 mm away from a main surface of the sidewall, the inclined sides of the extension blocks being inclined at angles of 40° to 80° relative to the polygonal base, the number of extension blocks in the radially outer concentric ring of blocks is twice the number of extension blocks in the radially inner concentric ring of blocks, a second opposing sidewall having a different extension block configuration, extension blocks of the second opposing sidewall being located adjacent to the tread edge region and along a circumference of the second opposing sidewall, each block being associated with a tread element in the tread edge region, the blocks being arranged in an alternating pattern of first and second blocks wherein a portion of the first blocks is a circumferential extension located radially inward of the second blocks, the second blocks having a predominate length in the circumferential direction of the tire, the predominate length being inclined at an angle of 0° to 40° relative to the circumferential direction of the tire, a circumferential extension of the first blocks having a maximum circumferential length of a pitch length, the pitch length being a circumferential length between adjacent first blocks, the first blocks having a radial length greater than a radial length of the second blocks, the first blocks extending directly from tread elements in the tread edge region, the second blocks being spaced from the tread elements in the tread edge region.

* * * * *